United States Patent [19]

Dent

[11] Patent Number: 5,081,679

[45] Date of Patent: Jan. 14, 1992

[54] RESYNCHRONIZATION OF ENCRYPTION SYSTEMS UPON HANDOFF

[75] Inventor: Paul Dent, Stehag, Sweden

[73] Assignee: Ericsson GE Mobile Communications Holding Inc., Paramus, N.J.

[21] Appl. No.: 556,103

[22] Filed: Jul. 20, 1990

[51] Int. Cl.⁵ .............................................. H04L 9/02
[52] U.S. Cl. ....................................... 380/48; 380/43; 380/49; 379/59; 379/60; 455/33
[58] Field of Search ....................... 380/21, 23, 28, 43, 380/44, 46, 47, 48, 49, 50; 379/59, 60, 61, 62, 63; 455/33; 375/110, 112, 107; 370/103, 105, 107

[56] References Cited

U.S. PATENT DOCUMENTS

| | | | |
|---|---|---|---|
| 3,934,078 | 1/1976 | Gannett | 178/22 |
| 4,549,308 | 10/1985 | LoPinto | 455/26 |
| 4,555,805 | 11/1985 | Talbot | 455/26 |
| 4,649,543 | 3/1987 | Levine | 371/41 |
| 4,731,840 | 3/1988 | Mniszewski et al. | 380/21 |
| 4,754,481 | 6/1988 | Feggeler | 380/41 |
| 4,803,726 | 2/1989 | Levine et al. | 380/48 |
| 4,827,507 | 5/1989 | Marry et al. | 380/38 |
| 4,860,353 | 8/1989 | Brown | 380/44 |
| 4,876,740 | 10/1989 | Levine et al. | 455/33 |
| 4,896,370 | 1/1990 | Kasparian et al. | 455/77 |
| 4,914,696 | 4/1990 | Dudczak et al. | 380/21 |
| 4,924,480 | 5/1990 | Gay et al. | 375/8 |
| 4,926,665 | 5/1990 | Stapley et al. | 70/277 |
| 4,972,439 | 11/1990 | Kuznicki et al. | 379/63 X |

Primary Examiner—Thomas H. Tarcza
Assistant Examiner—Tod Swann
Attorney, Agent, or Firm—Johnson & Gibbs

[57] ABSTRACT

A system for the synchronization of encryption and decryption in a duplex cellular radio system in which an encrypted call may be switched from one cell to another. At the instant of handoff, a rapid first resynchronization means temporarily seizes the voice channel in one direction only and transmits synchronization information in such one direction. The first resynchronization means ceases to transmit the synchronization information and releases such one direction of the voice channel as soon as an indicator of successful resynchronization is detected in the other direction. Transmission of speech traffic in such one direction is then resumed after such detection of successful resynchronization. To avoid occupying such one direction with continuous transmission of the synchronization information in the event successful resynchronization has occurred but has not been detected due to faulty transmission in the other direction, an upper limit is set on the length of time which the first rapid synchronization means may cease such one direction. After such timeout, resynchronization information may be provided by a second resynchronization means at a slower rate through a slow rate control channel bit stream which is multiplexed with the traffic data.

39 Claims, 4 Drawing Sheets

RESYNCHRONIZATION OF ENCRYPTION SYSTEMS UPON HANDOFF

CROSS REFERENCE TO RELATED APPLICATIONS

This application contains subject matter related to co-pending U.S. patent application Ser. No. 556,358, entitled "Encryption System For Digital Cellular Communication", and also to co-pending U.S. patent application Ser. No. 556,102, entitled "Continuous Cipher Synchronization For Cellular Communication System", both of which were filed on even date herewith and assigned to the assignee of the present invention. Such applications and the disclosures therein are hereby incorporated by reference herein.

BACKGROUND OF THE INVENTION

1. Field of the Invention

The present invention relates to digital cellular communication systems, and more particularly, to a method and apparatus for the encryption of data communications within such a system.

2. History of the Prior Art

Cellular radio communications is, perhaps, the fastest growing field in the world-wide telecommunications industry. Although cellular radio communication systems comprise only a small fraction of the telecommunications systems presently in operation, it is widely believed that this fraction will steadily increase and will represent a major portion of the entire telecommunications market in the not too distant future. This belief is grounded in the inherent limitations of conventional telephone communications networks which rely primarily on wire technology to connect subscribers within the network. A standard household or office telephone, for example, is connected to a wall outlet, or phone jack, by a telephone cord of a certain maximum length. Similarly, wires connect the telephone outlet with a local switching office of the telephone company. A telephone user's movement is thus restricted not only by the length of the telephone cord, but also by the availability of an operative telephone outlet, i.e. an outlet which has been connected with the local switching office. Indeed, the genesis of cellular radio systems can be attributed, in large part, to the desire to overcome these restrictions and to afford the telephone user the freedom to move about or to travel away from his home or office without sacrificing his ability to communicate effectively with others. In a typical cellular radio system, the user, or the user's vehicle, carries a relatively small, wireless device which communicates with a base station and connects the user to other mobile stations in the system and to landline parties in the public switched telephone network (PSTN).

A significant disadvantage of existing cellular radio communication systems is the ease with which analog radio transmissions may be intercepted. In particular, some or all of the communications between the mobile station and the base station may be monitored, without authorization, simply by tuning an appropriate electronic receiver to the frequency or frequencies of the communications. Hence, anyone with access to such a receiver and an interest in eavesdropping can violate the privacy of the communications virtually at will and with total impunity. While there have been efforts to make electronic eavesdropping illegal, the clandestine nature of such activities generally means that most, if not all, instances of eavesdropping will go undetected and, therefore, unpunished and undeterred. The possibility that a competitor or a foe may decide to "tune in" to one's seemingly private telephone conversations has heretofore hindered the proliferation of cellular radio communication systems and, left unchecked, will continue to threaten the viability of such systems for businesses and government applications.

It has recently become clear that the cellular radio telecommunications systems of the future will be implemented using digital rather than analog technology. The switch to digital is dictated, primarily, by considerations relating to system speed and capacity. A single analog, or voice, radio frequency (RF) channel can accommodate four (4) to six (6) digital, or data, RF channels. Thus, by digitizing speech prior to transmission over the voice channel, the channel capacity and, consequently the overall system capacity, may be increased dramatically without increasing the bandwidth of the voice channel. As a corollary, the system is able to handle a substantially greater number of mobile stations at a significantly lower cost.

Although the switch from analog to digital cellular radio systems ameliorates somewhat the likelihood of breeches in the security of communications between the base station and the mobile station, the risk of electronic eavesdropping is far from eliminated. A digital receiver may be constructed which is capable of decoding the digital signals and generating the original speech. The hardware may be more complicated and the undertaking more expensive than in the case of analog transmission, but the possibility persists that highly personal or sensitive conversations in a digital cellular radio system may be monitored by a third party and potentially used to the detriment of the system users. Moreover, the very possibility of a third party eavesdropping on a telephone conversation automatically precludes the use of cellular telecommunications in certain government applications. Certain business users may be equally sensitive to the possibility of a security breech. Thus, to render cellular systems as viable alternatives to the conventional wireline networks, security of communications must be available on at least some circuits.

Once a decision has been made to protect the transmission of digital information (data) from unauthorized access, the originator (sender) and the intended recipient (receiver) of the data must agree on a secret mechanism for enciphering (encrypting) and deciphering (decrypting) the information. Such an agreement usually involves a mutual commitment to use a particular encryption device which may be widely available, but which can be programmed with a secret key specific to the sender and receiver. The agreement, however, must also include choices with respect to the encryption technique and the method of synchronization to be used by the encryption device.

Several encryption techniques are known and implemented by prior art encryption devices. In one such technique, known as "block substitution", the secret key bits are mixed with blocks of data bits to produce blocks of encrypted data. With block substitution, blocks of data bits which differ merely by a single bit produce encrypted data blocks which differ, on the average, in one half ($\frac{1}{2}$) of their bit positions and vise versa. Similarly, encrypted data blocks differing only in one bit position will produce decrypted data blocks differing, on the average, in one half ($\frac{1}{2}$) of their bit positions. This type of encryption/decryption tends to magnify the effects of bit errors which may occur upon transmission of the encrypted data and, therefore, is not an appropriate technique for use in digital radio communications.

Another known encryption technique relies on a keystream generator and modular arithmetic or finite math. A plurality of secret key bits and a series of clock pulses are applied to the keystream generator which generates a stream of pseudo-random bits referred to as a keystream. The keystream bits are then bit-by-bit modulo-2 added to the data bits prior to transmission by the sender. An identical keystream generator is used by the receiver to produce an identical keystream of bits which are then bit-by-bit modulo-2 subtracted from the received encrypted data stream to recover the original data. Proper implementation of this technique requires that the sender and receiver keystream generators be synchronized so that the keystream generated at the receiver and subtracted from the encrypted data is in harmony with the keystream generated at the sender and added to the original data.

An encryption technique which generates a large number of complex keystream bits and which may be implemented in a general purpose Arithmetic and Logic Unit (ALU) is disclosed in co-pending U.S. patent application Ser. No. 556,358, entitled "Encryption System For Digital Cellular Communication", first mentioned above. The present invention is directed to a related but distinct aspect of an encryption system, generally, the synchronization of the encryption and decryption of data transmitted over an RF link and, more specifically, the synchronization of encryption and decryption upon handoff in a duplex cellular radio system.

A variety of approaches to the issue of synchronization may be found in prior art encryption systems. In most encryption systems, synchronization may be viewed as an agreement between the sender and the receiver on the number of clock pulses to be applied from a common initial state until the generation of a particular bit. Other prior art encryption systems, however, do not keep a running count of the number of applied clock pulses and rely, instead, on the initialization of the sender and receiver to the same state at the beginning of a frame and the application of an identical number of clock pulses thereafter. The shortcoming of the latter scheme is the difficulty of reestablishing synchronization should the sender and receiver fall out of synchronization during a particular frame.

Yet another type of encryption system includes a counter which maintains a count of the number of keystream bits, or blocks of keystream bits, previously generated. The output bits of the counter are combined with the secret key bits to generate the keystream. Because the transmitter and receiver counters are incremented on a regular basis and, therefore, take on the characteristics of a digital time/date clock, such an encryption system is often referred to as a time-of-day driven encryption system.

The advantage of the time-of-day driven encryption system resides in the fact that if the receiver counter falls out of synchronization with the transmitter counter and the system has the capability of providing the receiver with the current transmitter counter value, the receiver counter may be immediately reset to the transmitter counter value instead of returning to the beginning and applying the entire history of clock pulses. The difficulty with such a system, however, is the provision of the transmitter counter value on a sufficiently frequent basis to avoid the accumulation of errors caused by the divergence of the receiver counter value from the transmitter counter value for a relatively long period of time.

A continuous synchronization technique which may be used to synchronize a time-of-day encryption system and to prevent the aforementioned accumulation of errors is disclosed in co-pending U.S. patent application Ser. No. 556,102, entitled "Continuous Cipher Synchronization For Cellular Communication System", and first referenced above. The present invention is directed to a method and apparatus for resynchronization of an encryption system upon "handoff" of communications between cells of a duplex cellular radio system, i.e., a cellular radio system in which enciphered digital communication traffic is simultaneously sent from a base station to a mobile station and from the mobile station to the base station.

Because each of the cells in a cellular radio system may be relatively small in size, the likelihood of one of the mobile stations travelling out of one cell and into another cell is great. As the mobile stations travel through the cellular system, they may reach the radio coverage limit of one cell and, therefore, be better served by another cell. The process of switching an established call from one cell to another is known as handoff. The cellular system usually tracks each mobile station and assesses the need for a handoff by periodically measuring the signal strength of the surrounding base stations. If the measured signal strength of the base station presently serving the mobile station falls below a predetermined level, the cellular system determines the availability of other channels in neighboring cells and transmits a command to the mobile station, via a high speed data message interrupting the speech communications on the voice channel (a blank and burst data message), to retune to a frequency which is available in a new cell. The mobile station mutes the speech and tunes to the radio channel indicated in the blank and burst data message. Speech transmission is resumed after the mobile station has tuned to the new channel.

Handoffs between base stations in a cellular radio system may also occur for reasons other than the limitations in the radio coverage of a base station. For example, handoff may be performed because of excessive interference in a channel, traffic congestion at a base station or for a variety of other reasons which render handoff advisable or necessary. It should be noted, moreover, that handoffs may also take place between different cellular systems in order to maintain a call as a mobile station passes from the radio coverage area of one cellular system to another, and possibly unrelated, cellular system.

A number of complications are introduced to the process of handoff when transmissions in the cellular system are digitized and encrypted. One practical problem arises from the fact that the encryption system counter in one base station may be completely out of synchronization with the corresponding counter in another base station. This is particularly true with respect to base stations operated by commercially distinct, and often competing, entities. The issue in terms of handoff is how to ascertain the counter value at the new base station with a minimum of interruption to the speech stream. It should be noted in this connection that the base station must be the "master" as far as the count value is concerned. Otherwise, if the mobile station was the master, then each base station would be required to maintain a large number of counter values, one for each mobile station being served by the base station. Designating the mobile station as the master would thus preclude the use of time-sharing and cost-reducing hardware. It is desirable, instead, to have a single universal counter value in each base station which may be used to synchronize all of the mobile stations being served by the base station. In sum, upon handoff, the new base station must transmit to the mobile station the new counter value which may then be used, if necessary, to reset the counter in the mobile station.

Another practical problem in performing handoff of an encrypted telephone conversation is caused by transmission delays in the communications between elements in the land network, for example, between the base stations and a mobile switching center (MSC) which coordinates the operation of the cellular system. Such delays may prevent the mobile station from tuning to the new base station frequency at exactly the same time that the new base station begins broadcasting the new counter value. In particular, the blank and burst data message commanding the mobile station to tune to a new base station frequency is usually sent by the MSC to the old base station and relayed to the mobile station. At the same time, the MSC signals the new base station to begin broadcasting the new counter value. However, the transmission delays in the communications link between the MSC and the old base station are not necessarily the same as the transmission delays in the communications link between the MSC and the new base station. For example, the former communications link may not have the same number of signal repeaters as the latter communications link. Hence, there could be a period of uncertainty from the time the mobile station becomes tuned to the new base station frequency and the time that the new base station begins broadcasting the new counter value.

One objective of the present invention is to minimize the interruption of the speech or voice traffic flow upon handoff by providing a first means for rapidly resynchronizing a mobile station with a new base station and a second means for ensuring resynchronization should the first rapid means fail to achieve resynchronization. The interruption of speech traffic upon handoff may be further minimized in accordance with the present invention where the cellular system includes a mechanism for synchronization of the respective base stations.

SUMMARY OF THE INVENTION

In one aspect the system of the invention includes a duplex communication system employing cryptographically encoded data within a digital cellular telecommunications network in which there is generated in a first and second base station within the network a first pseudo-random key stream of bits in accordance with an algorithm. The bits of the first key stream are combined within the base stations with a stream of data bits carrying communications information to be sent from the base stations to a mobile station to cryptographically encode the data stream and with a stream of cryptographically encoded data received from the mobile station to decode the data into communications information. These is generated in said mobile station a second pseudo-random key stream of bits in accordance with the algorithm. The bits of the second key stream are combined in the mobile station with a stream of data bits carrying communications information to be sent from the mobile station to the base stations to cryptographically encode the data stream and with a stream of cryptographically encoded data received from the base stations to decode the data into communications information. Cryptographically encoded data is transmitted on a high data rate message channel from the first base station to the mobile station and from the mobile station to the first base station. Synchronization information is periodically transmitted on a low data rate channel from the first base station to the mobile station to maintain the first and second key streams in exact synchronization with one another. A command is sent from the first base station to a second base station and to the mobile station indicative of a handoff of the mobile station to a second base station. Uncryptographically encoded synchronization information is transmitted in response to a handoff command on a high data rate control channel from the second base station to the mobile station for a selected period of time. Synchronization information is periodically transmitted on a low data rate channel from said second base station to the mobile station. The mobile station searches for synchronization information from the second base station on either a high data rate control channel or a low bit rate channel and, upon the detection of either, establishes synchronization between the first pseudorandom key stream of the second base station and the second pseudo-random key stream of the mobile station to enable the mobile station to transmit cryptographically encoded data to the second base station. The transmission of uncryptographically encoded synchronization information on a high data rate control channel from said second base station to said mobile station is interrupted and the transmission of cryptographically encoded data on a high data rate traffic message channel is started in response to either the receipt by the second base station of correctly decodable cryptographically encoded data from the mobile station or the expiration of said selected period of time.

In another aspect, the invention includes a method and system for resynchronizing the generation of key stream bits used to cryptographically encode and decode digital communications data transmitted between the base stations and the mobile stations of a digital cellular telecommunications system. Synchronization information is periodically transmitted on a low data rate channel from said base stations to the mobile stations to maintain the key stream in each mobile station in exact synchronization with the key stream in the base station with which it is in communication. Signals indicative of a handoff of a mobile station from a first base station to a second base station are responded to by interrupting the flow of cryptographically encoded data bits from the second base station to the mobile station and instead transmitting synchronization information on a high data rate channel to the mobile station for a preselected period of time. Synchronization information is continued to be transmitted on a low bit rate channel from the second base station to the mobile station. Reception by the second base station of correctly decodable cryptographically encoded data bits from the mobile station, indicating that resynchronization has taken place, or the expiration of the preselected period of time is responded to by discontinuing transmission by the second base station of synchronization information on the high bit rate channel and resuming transmission of cryptographically encoded message traffic data bits from the second base station to the mobile station.

BRIEF DESCRIPTION OF THE DRAWINGS

The present invention will be better understood and its numerous objects and advantages will become apparent to those skilled in the art by reference to the following drawings in which.

DETAILED DESCRIPTION OF THE PREFERRED EMBODIMENT

Figure 1:
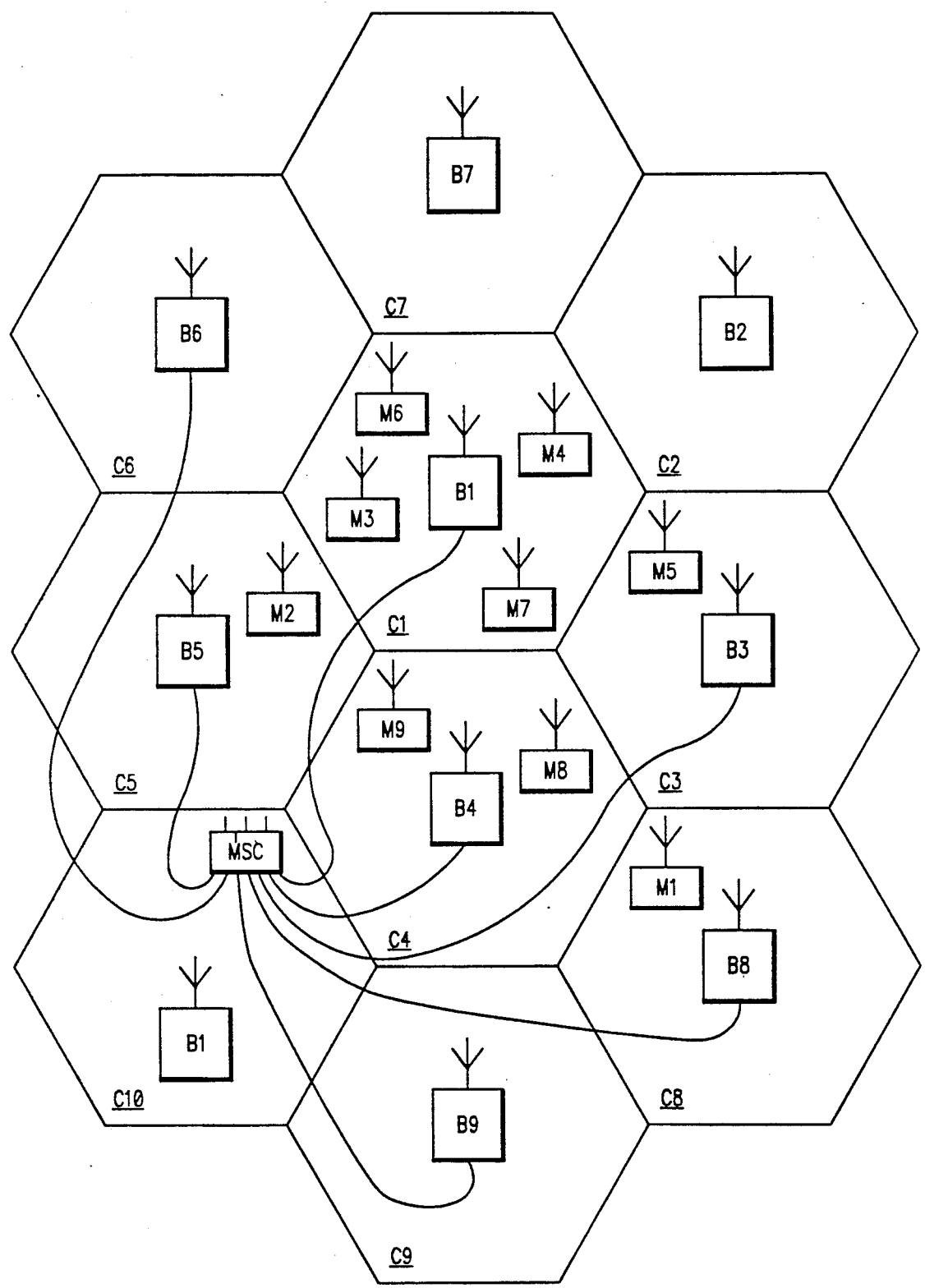
FIG. 1 is a pictorial representation of a cellular radio communications system including a mobile switching center, a plurality of base stations and a plurality of mobile stations.

Referring first to FIG. 1, there is illustrated therein a conventional cellular radio communications system of a type to which the present invention generally pertains. In FIG. 1, an arbitrary geographic area may be seen divided into a plurality of contiguous radio coverage areas, or cells, C1-C10. While the system of FIG. 1 is shown to include only 10 cells, it should be clearly understood that, in practice, the number of cells may be much larger.

Associated with and located within each of the cells C1-C10 is a base station designated as a corresponding one of a plurality of base stations B1-B10. Each of the base stations B1-B10 includes a transmitter, a receiver and controller as is well known in the art. In FIG. 1, the base stations B1-B10 are located at the center of the cells C1-C10, respectively, and are equipped with omni-directional antennas. However, in other configurations of the cellular radio system, the base stations B1-B10 may be located near the periphery, or otherwise away from the centers of the cells C1-C10 and may illuminate the cells C1-C10 with radio signals either omni-directionally or directionally. Therefore, the representation of the cellular radio system of FIG. 1 is for purposes of illustration only and is not intended as a limitation on the possible implementations of the cellular radio system.

With continuing reference to FIG. 1, a plurality of mobile stations M1-M10 may be found within the cells C1-C10. Again, only ten mobile stations are shown in FIG. 1 but it should be understood that the actual number of mobile stations may be much larger in practice and will invariably exceed the number of base stations. Moreover, while none of the mobile stations M1-M10 may be found in some of the cells C1-C10, the presence or absence of the mobile stations M1-M10 in any particular one of the cells C1-C10 should be understood to depend, in practice, on the individual desires of each of the mobile stations M1-M10 who may roam from one location in a cell to another or from one cell to an adjacent or neighboring cell.

Each of the mobile stations M1-M10 is capable of initiating or receiving a telephone call through one or more of the base stations B1-B10 and a mobile switching center MSC. The mobile switching center MSC is connected by communications links, e.g. cables, to each of the illustrative base stations B1-B10 and to the fixed public switching telephone network (PSTN), not shown, or a similar fixed network which may include an integrated system digital network (ISDN) facility. The relevant connections between the mobile switching center MSC and the base stations B1-B10, or between the mobile switching center MSC and the PSTN or ISDN, are not completely shown in FIG. 1 but are well known to those of ordinary skill in the art. Similarly, it is also known to include more than one mobile switching center in a cellular radio system and to connect each additional mobile switching center to a different group of base stations and to other mobile switching centers via cable or radio links.

Each of the cells C1-C10 is allocated a plurality of voice or speech channels and at least one access or control channel. The control channel is used to control or supervise the operation of mobile stations by means of information transmitted to and received from those units. Such information may include incoming call signals, outgoing call signals, page signals, page response signals, location registration signals, voice channel assignments, maintenance instructions and "handoff" instructions as a mobile station travels out of the radio coverage of one cell and into the radio coverage of another cell. The control or voice channels may operate either in an analog or a digital mode or a combination thereof. In the digital mode, analog messages, such as voice or control signals, are converted to digital signal representations prior to transmission over the RF channel. Purely data messages, such as those generated by computers or by digitized voice devices, may be formatted and transmitted directly over a digital channel.

In a cellular radio system using time division multiplexing (TDM), a plurality of digital channels may share a common RF channel. The RF channel is divided into a series of "time slots", each containing a burst of information from a different data source and separated by guard time from one another, and the time slots are grouped into "frames" as is well known in the art. The number of time slots per frame varies depending on the bandwidth of the digital channels sought to be accommodated by the RF channel. The frame may, for example, consist of three (3) time slots, each of which is allocated to a digital channel. Thus, the RF channel will accommodate three digital channels. In one embodiment of the present invention discussed herein, a frame is designated to comprise three time slots. However, the teachings of the present invention should be clearly understood to be equally applicable to a cellular radio system utilizing any number of time slots per frame.

Figure 2:
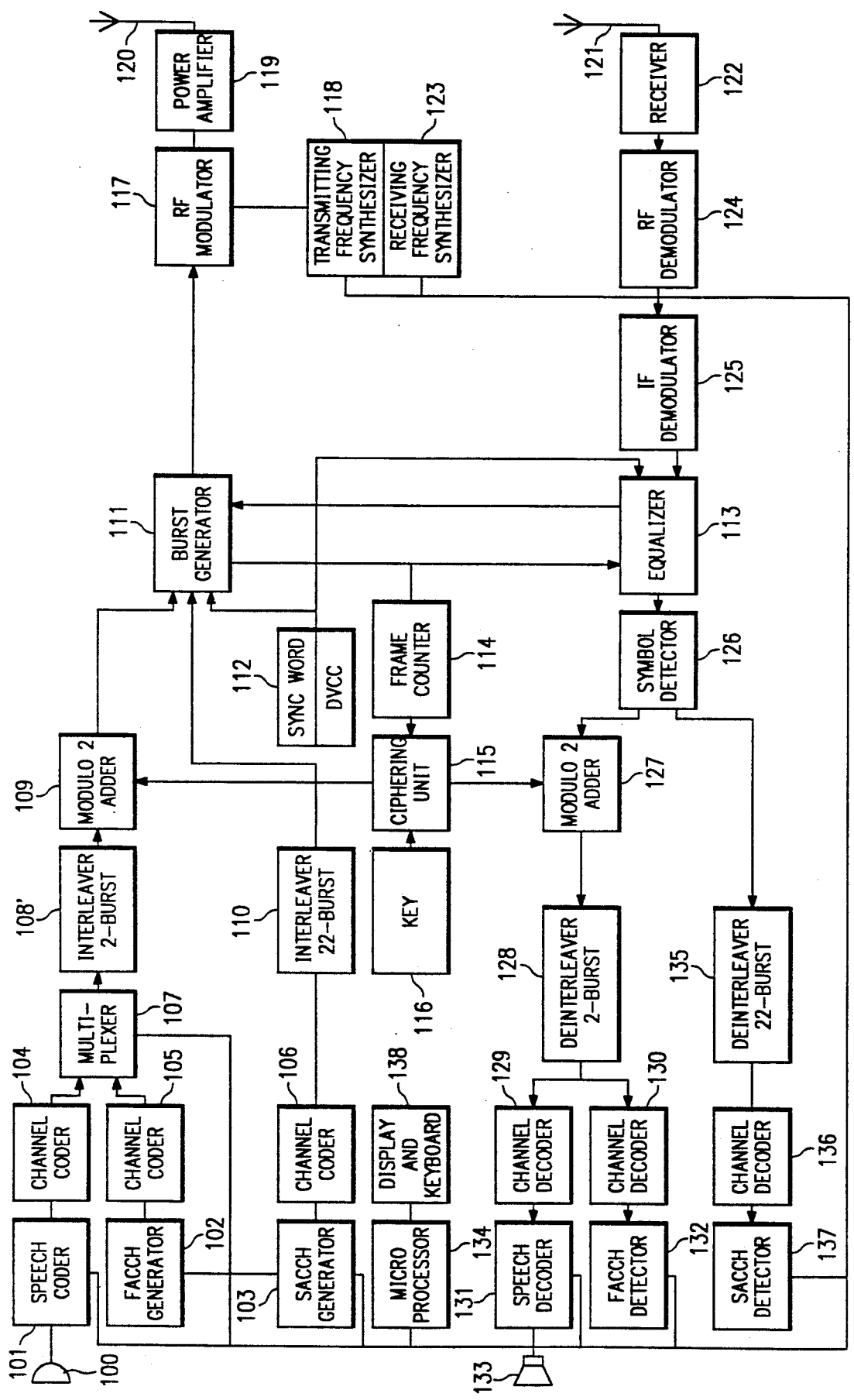
FIG. 2 is a schematic block diagram of mobile station equipment used in accordance with one embodiment of the system of the present invention.

Referring next to FIG. 2, there is shown therein a schematic block diagram of the mobile station equipment which are used in accordance with one embodiment of the present invention. The equipment illustrated in FIG. 2 may be used for communication over digital channels. A voice signal detected by a microphone 100 and destined for transmission by the mobile station is provided as input to a speech coder 101 which converts the analog voice signal into a digital data bit stream. The data bit stream is then divided into data packets or messages in accordance with the time division multiple access (TDMA) technique of digital communications. A fast associated control channel (FACCH) generator 102 exchanges control or supervisory messages with a base station in the cellular radio system. The conventional FACCH generator operates in a "blank and burst" fashion whereby a user frame of data is muted and the control message generated by the FACCH generator 102 is transmitted instead at a fast rate.

In contrast to the blank and burst operation of the FACCH generator 102, a slow associated control channel (SACCH) generator 103 continuously exchanges control messages with the base station. The output of the SACCH generator is assigned a fixed length byte, e.g. 12 bits, and included as a part of each time slot in the message train (frames). Channel coders 104, 105, 106 are connected to the speech coder 101, FACCH generator 102 and SACCH generator 103, respectively. Each of the channel coders 104, 105, 106 performs error detection and recovery by manipulating incoming data using the techniques of convolutional encoding, which protects important data bits in the speech code, and cyclic redundancy check (CRC), wherein the most significant bits in the speech coder frame, e.g., 12 bits, are used for computing a 7 bit error check.

Referring again to FIG. 2, the channel coders 104, 105 are connected to a multiplexer 107 which is used for time division multiplexing of the digitized voice messages with the FACCH supervisory messages. The output of the multiplexer 107 is coupled to a 2-burst interlever 108 which divides each data message to be transmitted by the mobile station (for example, a message containing 260 bits) into two equal but separate parts (each part containing 130 bits) arranged in two consecutive time slots. In this manner, the deteriorative effects of Rayleigh fading may be significantly reduced. The output of the 2-burst interleaver 108 is provided as input to a modulo-2 adder 109 where the data to be transmitted is ciphered on a bit-by-bit basis by logical modulo-2 addition with a pseudo-random keystream which may be generated in accordance with the system described in the co-pending U.S. patent application entitled "Encryption System for Digital Cellular Communications", referred to above.

The output of the channel coder 106 is provided as input to a 22-burst interleaver 110. The 22-burst interleaver 110 divides the SACCH data into 22 consecutive time slots, each occupied by a byte consisting of 12 bits of control information. The interleaved SACCH data forms one of the inputs to a burst generator 111. Another input to the burst generator 111 is provided by the output of the modulo-2 adder 109. The burst generator 111 produces "message bursts" of data, each consisting of a time slot identifier (TI), a digital verification color code (DVCC), control or supervisory information and the data to be transmitted, as further explained below.

Transmitted in each of the time slots in a frame is a time slot identifier (TI), which is used for time slot identification and receiver synchronization, and a digital verification color code (DVCC), which ensures that the proper RF channel is being decoded. In the exemplary frame of the present invention, a set of three different 28-bit TIs is defined, one for each time slot while an identical 8-bit DVCC is transmitted in each of the three time slots. The TI and DVCC are provided in the mobile station by a sync word/DVCC generator 112 connected to the burst generator 111 as shown in FIG. 2. The burst generator 111 combines the outputs of the modulo-2 adder 109, the 22-burst interleaver 110 and the sync word/DVCC generator 112 to produce a series of message bursts, each comprised of data (260 bits), SACCH information (12 bits), TI (28 bits), coded DVCC (12 bits) and 12 delimiter bits for a total of 324 bits which may be integrated according to the time slot format specified by the EIA/TIA IS-54 standard.

Each of the message bursts is transmitted in one of the three time slots included in a frame as discussed hereinabove. The burst generator 111 is connected to an equalizer 113 which provides the timing needed to synchronize the transmission of one time slot with the transmission of the other two time slots. The equalizer 113 detects timing signals sent from the base station (master) to the mobile station (slave) and synchronizes the burst generator 111 accordingly. The equalizer 113 may also be used for checking the values of the TI and the DVCC. The burst generator 111 is also connected to a 20 ms frame counter 114 which is used to update a ciphering code that is applied by the mobile station every 20 ms, i.e., once for every transmitted frame. The ciphering code is generated by a ciphering unit 115 with the use of a mathematical algorithm and under the control of a key 116 which is unique to each mobile station. The algorithm may be used to generate a pseudo-random keystream in accordance with the system described in the co-ending U.S. patent application entitled "Encryption System for Digital Cellular Communications".

The message bursts produced by the burst generator 110 are provided as input to an RF modulator 117. The RF modulator 117 is used for modulating a carrier frequency according to the $\pi/4$-DQPSK technique ($\pi/4$ shifted, differentially encoded quadrature phase shift key). The use of this technique implies that the information to be transmitted by the mobile station is differentially encoded, i.e., two bit symbols are transmitted as 4 possible changes in phase: + or $-\pi/4$ and + or $-3\pi/3$. The carrier frequency for the selected transmitting channel is supplied to the RF modulator 117 by a transmitting frequency synthesizer 118. The burst modulated carrier signal output of the RF modulator 117 is amplified by a power amplifier 119 and then transmitted to the base station through an antenna 120.

The mobile station receives burst modulated signals from the base station through an antenna 121 connected to a receiver 122. A receiver carrier frequency for the selected receiving channel is generated by a receiving frequency synthesizer 123 and supplied to a an RF demodulator 124. The RF demodulator 124 is used to demodulate the received carrier signal into an intermediate frequency signal. The intermediate frequency signal is then demodulated further by an IF demodulator 125 which recovers the original digital information as it existed prior to $\pi/4$-DQPSK modulation. The digital information is then passed through the equalizer 113 to a symbol detector 126 which converts the two-bit symbol format of the digital data provided by the equalizer 114 to a single bit data stream.

The symbol detector 126 produces two distinct outputs: a first output, comprised of digitized speech data and FACCH data, and a second output, comprised of SACCH data. The first output is supplied to a modulo-2 adder 127 which is connected to a 2-burst deinterleaver 128. The modulo-2 adder 127 is connected to the ciphering unit 115 and is used to decipher the encrypted transmitted data by subtracting on a bit-by-bit basis the same pseudo-random keystream used by the transmitter in the base station to encrypt the data. The modulo-2 adder 127 and the 2-burst deinterleaver 128 reconstruct the speech/FACCH data by assembling and rearranging information derived from two consecutive frames of the digital data. The 2-burst deinterleaver 128 is coupled to two channel decoders 129, 130 which decode the convolutionally encoded speech/FACCH data using the reverse process of coding and check the cyclic redundancy check (CRC) bits to determine if any error has occurred. The channel decoders 129, 130 detect distinctions between the speech data on the one hand, and any FACCH data on the other, and route the speech data and the FACCH data to a speech decoder 131 and an FACCH detector 132, respectively. The speech decoder 131 processes the speech data supplied by the channel decoder 129 in accordance with a speech coder algorithm, e.g. VSELP, and generates an analog signal representative of the speech signal transmitted by the base station and received by the mobile station. A filtering technique may then be used to enhance the quality of the analog signal prior to broadcast by a speaker 133. Any FACCH messages detected by the FACCH detector 132 are forwarded to a microprocessor 134.

The second output of the symbol detector 126 (SACCH data) is supplied to a 22-burst deinterleaver 135. The 22-burst interleaver 135 reassembles and rearranges the SACCH data which is spread over 22 consecutive frames. The output of the 22-burst deinterleaver 135 is provided as input to a channel decoder 136. SACCH messages are detected by an SACCH detector 137 and the control information is transferred to the microprocessor 134.

The microprocessor 134 controls the activities of the mobile station and communications between the mobile station and the base station. Decisions are made by the microprocessor 134 in accordance with messages received from the base station and measurements performed by the mobile station. The microprocessor 134 is also provided with a terminal keyboard input and display output unit 138. The keyboard and display unit 138 allows the mobile station user to exchange information with the base station.

Figure 3:
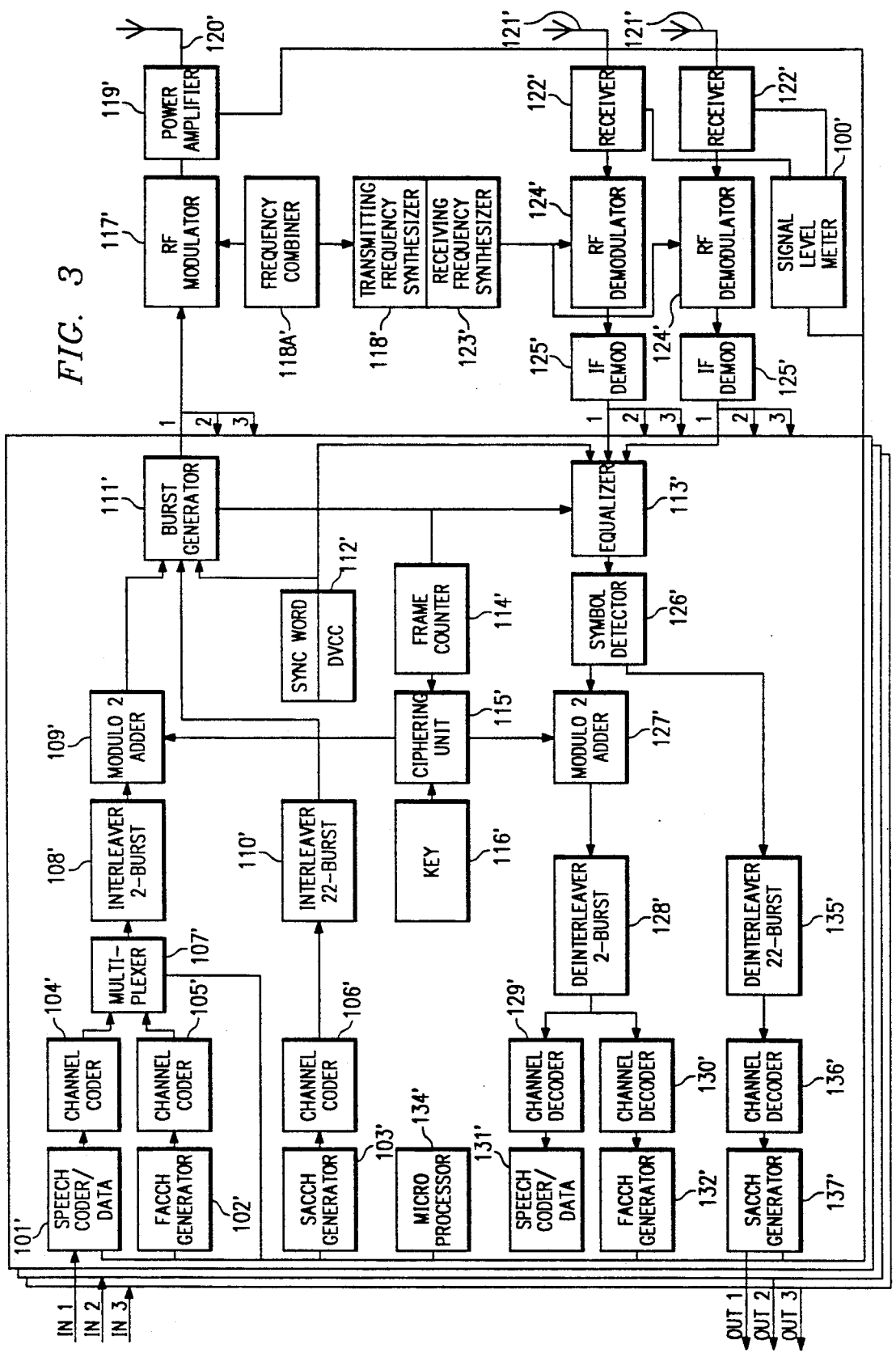
FIG. 3 is a schematic block diagram of base station equipment used in accordance with one embodiment of the system of the present invention.

Referring next to FIG. 3, there is shown a schematic block diagram of the base station equipment which are used in accordance with the present invention. A comparison of the mobile station equipment shown in FIG. 2 with the base station equipment shown in FIG. 3 demonstrates that much of the equipment used by the mobile station and the base station are substantially identical in construction and function. Such identical equipment are, for the sake of convenience and consistency, designated with the same reference numerals in FIG. 3 as those used in connection with FIG. 2, but are differentiated by the addition of a prime (') in FIG. 3.

There are, however, some minor differences between the mobile station and the base station equipment. For instance, the base station has, not just one but, two receiving antennas 121'. Associated with each of the receiving antennas 121' are a receiver 122', an RF demodulator 124', and an IF demodulator 125'. Furthermore, the base station includes a programmable frequency combiner 118A' which is connected to a transmitting frequency synthesizer 118'. The frequency combiner 118A' and the transmitting frequency synthesizer 118' carry out the selection of the RF channels to be used by the base station according to the applicable cellular frequency reuse plan. The base station, however, does not include a user keyboard and display unit similar to the user keyboard and display unit 138 present in the mobile station. It does however include a signal level meter 100' connected to measure the signal received from each of the two receivers 122' and to provide an output to the microprocessor 134'. Other differences in equipment between the mobile station the base station may exist which are well known in the art.

The discussion thus far has focused on the operational environment of the system of the present invention. A specific description of a particular embodiment of the present invention follows. As disclosed above and used hereinafter, the term "keystream" means a pseudo-random sequence of binary bits or blocks of bits used to encipher a digitally encoded message or data signal prior to transmission or storage in a medium which is susceptible to unauthorized access, e.g., an RF channel. A "keystream generator" means a device which generates a keystream by processing a secret key comprised of a plurality of bits. Encryption may be simply performed by a modulo-2 addition of the keystream to the data to be encrypted. Similarly, decryption may be performed by a modulo-2 subtraction of an identical copy of the keystream from the encrypted data. In the description which follows, the words "encryption", "cryptographically encode", "encipher" and "scramble" and their derivatives are used interchangeably.

Generally speaking, the keystream generator provides a mechanism, represented by elements 115 and 115' of FIGS. 2 and 3, respectively, for expanding a relatively small number of secret bits, i.e., the secret key, represented by elements 116 and 116', into a much larger number of keystream bits which are then used to encrypt data messages prior to transmission (or storage). To decrypt an encoded message, the receiver must "know" the index to the keystream bits used to encrypt the message. In other words, the receiver must not only have the same keystream generator and generate the same keystream bits as the transmitter, but also, the receiver keystream generator must be operated in synchronism with the transmitter keystream generator if the message is to be properly decoded. Synchronization is normally achieved by continuously transmitting from the encoding system to the decoding system the contents of every internal memory device, such as bit, block or message counters, which participate in the generation of the keystream bits. Synchronization may be simplified, however, by using arithmetic bit block counters, such as binary counters, and incrementing those counters by a certain amount each time a new block of keystream bits is produced. Such counters may form a part of a real-time, i.e. hours, minutes and seconds, clock chain. A keystream generator relying on the latter type of counters is known as the "time-of-day" driven keystream generator to which reference was made hereinabove.

In general, the present invention uses a duplex cipher keystream generator so that synchronization in either the direction of base station to mobile station or the direction of mobile station to base station also establishes synchronization in the other direction. At the instant of handoff, a rapid first resynchronization means temporarily seizes the voice channel in one direction only, e.g., base station to mobile station, and transmits synchronization information, e.g., the new base station counter value, in such one direction. The first resynchronization means ceases to transmit the synchronization information and releases such one direction of the voice channel as soon as an indicator of successful resynchronization is detected in the other direction, e.g. receipt of correctly encrypted speech from the mobile station. Transmission of speech traffic in such one direction is then resumed after such detection of successful resynchronization. To avoid occupying such one direction with continuous transmission of the synchronization information in the event successful resynchronization has occurred but has not been detected due to faulty transmission in the other direction, an upper limit is set on the length of time which the first rapid synchronization means may cease such one direction. Such length of time (timeout) is sufficient, in the face of network delay uncertainties, to ensure that the mobile station has tuned to the new base station long enough to receive at least one transmission of synchronization information. After timeout, resynchronization information may be provided by a second resynchronization means at a slower rate through a slow associated control channel (SACCH) bit stream which is multiplexed with the traffic data.

Figure 4:
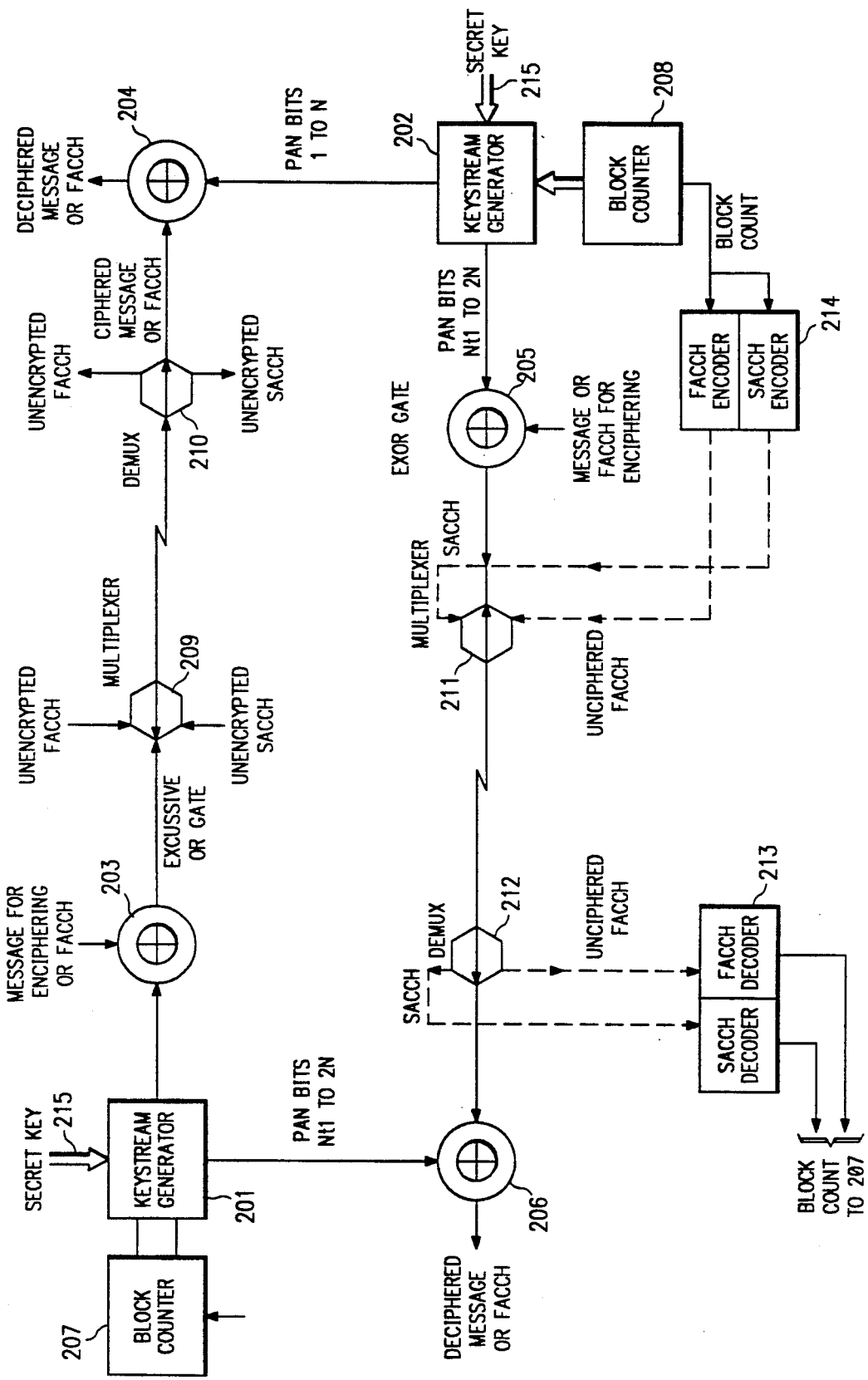
FIG. 4 is a schematic block diagram of a duplex encryption system constructed in accordance with the present invention.

Referring now to FIG. 4, there is shown therein a schematic block diagram of a duplex encryption system constructed in accordance with the present invention. The encryption system shown in FIG. 4 is used for the encryption and decryption of speech traffic in both directions of a voice channel, i.e., the direction of base station to mobile station and the direction of mobile station to base station. Keystream generators 201, 202 produce a number 2N of pseudo-random output bits (keystream) at the mobile station and base station, respectively. The pseudo-random bits are a function of a plurality of fixed bits and a plurality of variable bits which change after the production of each block of 2N bits. The fixed bits may include, for example, the bits of a secret key 215. The variable bits may include the state values of block counters 207, 208, but may, more generally, include the state values of some or all of the flip-flops or internal memory devices associated with the keystream generators 201, 202 respectively. At one end of the communications link, e.g., the base station, the first N pseudo-random bits in the block of 2N bits is used for encryption while the second N pseudo-random bits is used for decryption. At the other end, e.g., the mobile station, the use is reversed, i.e., the first N bits (1 to N) are used for decryption and the second N bits (N+1 to 2N) are used for encryption.

Encryption and decryption may be performed by bitwise modulo-2 addition of the keystream bits to a sequence of message or FACCH bits in modulo-2 adders 203, 206, respectively, at one end of the communications link and modulo-2 adders 205, 204, respectively, at the other end. Each of the modulo-2 adders 203, 204, 205, 206 may be constructed from a plurality of Exclusive OR (XOR) gates. Since modulo-2 addition and modulo-2 subtraction are identical operations, the second addition at the receiver of the same keystream used for encryption at the transmitter recovers the original message or FACCH bits. Such bit-by-bit encryption/decryption technique exhibits increased tolerance for radio transmission errors in that an erroneously received bit results in only one bit error after decryption. The particular encryption/decryption technique, however, is not integral to the operation of the present invention and the keystream bits may equally be used, for example, to control the order in which the message or FACCH bits are included in the transmitted signal, i.e., transposition. Similarly, a combination of the modulo-2 addition and the transposition techniques may be used without departing from the teachings of the present invention. It will be noted that numerous ones of the components shown in FIG. 4 are similarly shown in FIGS. 1-3 and, even though not discussed in connection with FIG. 4 their operation and function has already been discussed above.

During handoff of a mobile station from an old base station to a new base station, the old base station sends a handoff command to the mobile station as discussed hereinbefore. The handoff command includes certain identification information, such as the relevant frequency or time slot number, which may be used by the mobile station to recognize and tune to the new base station. Upon receipt of the handoff command, the mobile station will tune to the new base station frequency or time slot. In some prior art systems, the mobile station will also immediately begin transmitting over the new base station frequency or time slot, thereby severing all contact with the old base station. In any event, at the conclusion of handoff, the mobile station is ready to receive transmissions from the new base station and to transmit on the new base station frequency. Similarly, the new base station is ready to transmit to, and to receive transmissions from, the mobile station.

If the cellular system does not include a synchronization mechanism which ensures that the keystream generators of the new and old base stations are in synchronization, for example, that the value of the new base station block counter is the same as the value of the old base station block counter, the keystream generator at the mobile station will be out of synchronization with the keystream generator at the new base station following handoff. To restore synchronization in such instance and in accordance with the present invention, the new base station will transmit synchronization information, for example, the current value of the block counter in the new base station, to the mobile station over a high data rate control channel, such as the fast associated control channel (FACCH), in the blank and burst fashion previously discussed in connection with FIGS. 2-3. The synchronization information is transmitted unenciphered so that it may be understood and acted upon by the mobile station even in the absence of cipher synchronization. Additionally, the new base station simultaneously transmits the same synchronization information on a low data rate control channel, such as the slower sub-multiplexed SACCH also discussed in connection with FIGS. 2-3. The mobile station scans the FACCH and the SACCH for transmissions of the synchronization information and, upon detecting either, uses the synchronization information to resynchronize the mobile station keystream generator, for example, to update the value of the mobile station block counter. The mobile station may thereafter transmit correctly enciphered message and/or FACCH traffic to the new base station over a high data rate message channel. Upon detecting the reception of correctly enciphered traffic from the mobile station, the base station ceases transmission of the unencrypted synchronization information over the FACCH and begins transmission of encrypted message or FACCH traffic to the mobile station which is now able to decrypt such traffic. Thus, the duplex communications link between the base station and the mobile station is reestablished.

Should the detection of correctly enciphered traffic from the mobile station to the base station be delayed for any reason, for example, because of interference which is present only in the reverse channel, i.e., in the direction of mobile station to base station, it is not desirable that the forward channel, i.e., base station to mobile station, continue to transmit synchronization information over the FACCH indefinitely since the blank and burst FACCH transmission format mutes the speech and disrupts traffic flow in both directions. Consequently, after a certain number of FACCH transmissions of the synchronization information (the timeout period), the base station, in accordance with the present invention, ceases further FACCH transmission of the synchronization information and resumes transmission of encrypted message or FACCH traffic. Beyond the desire to minimize interruption of the speech traffic, there are other reasons which support the latter approach. First, because of potential delays in the direction mobile station to new base station, the possibility exists that the synchronization information has been received by the mobile station over the FACCH but that properly encrypted transmissions from the mobile station have been delayed. Second, even if the FACCH transmission of the synchronization information fails, resynchronization of the mobile station may nevertheless be achieved with the SACCH transmissions of the same synchronization information.

It will be appreciated that the length of the timeout is a network parameter which may be selectively changed to fit individual circumstances. In the extreme case where the cellular system includes a synchronization mechanism that ensures global synchronization of all the base stations, transmission of synchronization information over the FACCH is not necessary, i.e., the timeout length will be zero and traffic interruption will be kept to an absolute minimum.

In the general case where the base stations are not synchronized with one another, it may occur that, upon handoff and resynchronization in accordance with the present invention, the keystream generator at the mobile station is reset, for example, the mobile station block counter is reset, to a previous state. To prevent replication of a previously used keystream pattern, a handoff counter may be included in each of the base station and the mobile station. The handoff counter is initialized at call set up and incremented with each handoff. The output of the handoff counter is provided as input to the keystream generator in such a way that the output bit sequence produced is totally different for each different counter value.

The foregoing description shows only certain particular embodiments of the present invention. However, those skilled in the art will recognize that many modifications and variations may be made without departing substantially from the spirit and scope of the present invention. Accordingly, it should be clearly understood that the form of the invention described herein is exemplary only and is not intended as a limitation on the scope of the invention as defined in the following claims.

What is claimed is:

1. In a duplex communication system employing cryptographically encoded data within a digital cellular telecommunications network, a method which comprises:

generating in a first base station within said network a first pseudo-random key stream of bits in accordance with an algorithm;

combining in said first base station bits of said first key stream with a stream of data bits carrying communications information to be sent from said first base station to a mobile station to cryptographically encode said data stream and with a stream of cryptographically encoded data received from said mobile station to decode said data into communications information;

generating in said mobile station a second pseudo-random key stream of bits in accordance with said algorithm;

combining in said mobile station bits of said second key stream with a stream of data bits carrying communications information to be sent from said mobile station to said first base station to cryptographically encode said data stream and with a stream of cryptographically encoded data received from said first base station to decode said data into communications information;

transmitting cryptographically encoded data on a high data rate message channel from said first base station to said mobile station and from said mobile station to said first base station;

periodically transmitting synchronization information on a low data rate control channel from said first base station to said mobile station to synchronize said first and second key streams with one another;

sending a command from said first base station to said mobile station indicative of a handoff of said mobile station to a second base station;

generating in said second base station a third pseudo-random key stream of bits in accordance with said algorithm;

transmitting for a selected period of time in response to said handoff command uncryptographically encoded synchronization information on a high data rate control channel from said second base station to said mobile station to synchronize said second and third key streams with one another;

periodically transmitting synchronization information on a low data rate control channel from said second base station to said mobile station to synchronize said second and third key streams with one another;

searching within said mobile station for synchronization information from said second base station on either said high data rate control channel or said low data rate control channel and, upon the detection of either, synchronizing said second pseudo-random key stream of said mobile station with said third pseudo-random keystream of said second base station;

interrupting the transmission of uncryptographically encoded synchronization information on said high data rate control channel from said second base station to said mobile station and beginning the transmission of cryptographically encoded data on a high data rate message channel in response to either the receipt by said second base station of correctly decodable cryptographically encoded data from said mobile station or the expiration of said selected period of time.

2. In a duplex communication system employing cryptographically encoded data within a digital cellular telecommunications network, the method set forth in claim 1 wherein:

said high data rate control channel is the fast associated control channel and said low data rate control channel is the slow associated control channel.

3. In a duplex communication system employing cryptographically encoded data within a digital cellular telecommunications network, the method set forth in claim 1 wherein:

said preselected period of time is defined by a preselected number of transmissions of uncryptographically encoded synchronization information on said high data rate control channel.

4. In a duplex communication system employing cryptographically encoded data within a digital cellular telecommunications network, the method set forth in claim 1 which also includes:
interrupting the transmission of uncryptographically encoded synchronization information on said high data rate control channel from said second base station to said mobile station and beginning the transmission of cryptographically encoded data on said high data rate message channel when said first and third pseudo-random key streams in said first and second base stations, respectively, are synchronized with one another.

5. In a duplex communication system employing cryptographically encoded data within a digital cellular telecommunications network, the method set forth in claim 1 wherein:
each of said steps of generating one of said first, second and third pseudo-random key streams in accordance with said algorithm includes maintaining a value stored within a handoff counter, generating said one of said pseudo-random key streams as a function of the value stored in said counter, initializing the value stored in said counter upon call set up to said mobile station and incrementing the value stored in said counter each time the mobile station is handed off to a new base station during a call.

6. In a duplex communication system employing cryptographically encoded data within a digital cellular telecommunications network, the method set forth in claim 1 in which:
each of said steps of periodically transmitting synchronization information on said low data rate control channel from one of said first and second base stations to said mobile station includes interspersing said information with said transmissions of cryptographically encoded data thereto.

7. In a duplex communication system employing cryptographically encoded data within a digital cellular telecommunications network, the method set forth in claim 1 in which:
each of said steps of generating one of said first, second and third pseudo-random keystreams in accordance with said algorithm includes storing a multibit digital value within a register and generating said one of said key streams as a function of the value stored within said register; and
each of said steps of periodically transmitting synchronization information from one of said first and second base stations to said mobile station includes transmitting the value stored within the register of said one of said base stations to said mobile station for comparison with the value stored within the register of said mobile station to determine if key streams generated in said one of said base stations and said mobile station are in synchronism with one another.

8. In a duplex communication system employing cryptographically encoded data within a digital cellular telecommunications network, the method set forth in claim 1 in which:
the bits of said first, second and third pseudo-random key streams are combined with said streams of data bits carrying information to alter the order thereof and with said streams of cryptographically encoded data to restore the original order thereof.

9. In a dulex communication system employing cryptographically encoded data within a digital cellular telecommunications nework, the method set forth in claim 1 in which:
the bits of said first, second and third pseudo-random key streams are combined with said streams of data bits carrying information by modulo-2 addition and with said streams of cryptographically encoded data by modulo-2 subtraction.

10. A duplex communication system employing cryptographically encoded data within a digital cellular telecommunications network, comprising:
means for generating in a first base station within said network a first pseudo-random key stream of bits in accordance with an alogrithm;
means for combining in said first base station bits of said first key stream with a stream of data bits carrying communications information to be sent from said first base station to a mobile station to cryptographically encode said data stream and with a stream of cryptographically encoded data received from said mobile station to decode said data into communications information;
means for generating in said mobile station a second pseudo-random key stream of bits in accordance with said algorithm;
means for combining in said mobile station bits of said second key stream with a stream of data bits carrying communications information to be sent from said mobile station to said first base station to cryptographically encode said data stream and with a stream of cryptographically encoded data received from first base station to decode said data into communications information;
means for transmitting cryptographically encoded data on a high data rate message channel from said first base station to said mobile station and from said mobile station to said first base station;
means for periodically transmitting synchronization information on a low data rate control channel from said first base station to said mobile station to synchronize said first and second key streams with one another;
means for sending a command from said first base station to a second base station and to said mobile station indicative of a handoff of said mobile station to said second base station;
means for generating in said second base station a third pseudo-random key stream of bits in accordance with said alogorithm;
means for transmitting for a selected period of time in response to said handoff command uncryptographically encoded synchronization information on a high data control channel from said second base station to said mobile station to synchronize said second and third key streams with one another;
means for periodically transmitting synchronization information on a low data control channel from said second base station to said mobile station to synchronize said second and third key streams with one another;
means for searching within said mobile station for synchronization information from said second base station on either said high data rate control channel or said low data rate control channel and, upon the detection of either, synchronizing said second pseudo-random key stream of said mobile station with said third pseudo-random keystream of said second base station;

means for interrupting the transmission of uncryptographically encoded synchronization information on said high data rate control channel from said second base station to said mobile station and beginning the transmission of cryptographically encoded data on a high data rate message channel in response to either the receipt by said second base station of correctly decodable crytographically encoded data from said mobile station or the expiration of said selected period of time.

11. A duplex communication system employing crytographically encoded data within a digital cellular telecommunications network, as set forth in claim 10 wherein:
said high data rate control channel is the fast associated control channel.

12. A duplex communcations system employing cryptographically encoded data within a digital cellular telecommunications network, as set forth in claim 11 wherein:
said low data rate control channel is the slow associated control channel.

13. A duplex communication system employing crytographically encoded data within a digital cellular telecommunications network, as set forth in claim 10 wherein:
said preselected period of time is defined by a preselected number of transmissions of uncryptographically encoded synchronization information on said high data rate control channel.

14. A duplex communication system employing cryptographically encoded data within a digital cellular telecommunications network, as set forth in claim 10 which also includes:
means for interrupting the transmission of uncryptographically encoded synchronization information on said high data rate control channel from said second base station to said mobile station and begining the transsission of cryptographically enoded data on said high data rate message channel in response to the synchronization of said first and third pseudo-random key streams in said first and second base stations, respectively.

15. A duplex communication system employing cryptographically encoded data within a digital cellular telecommunications network, as set forth in claim 10 wherein:
each of said means for generating one of said first, second and third pseudo-random key streams in accordance with said alogorithm includes means for maintaining a value stored within a handoff counter, means for generating said one of said pseudo-random key streams as a function of the value stored in said counter, means for initalizing the value stored in said counter upon call set up to said mobile station and means for incrementing the value stored in said counter each time the mobile station is handed off to a new base station during a call.

16. A duplex communication system employing cryptographically encoded data within a digital cellular telecommunications network, as set forth in claim 10 in which:

each of said means for periodically transmitting synchronization information on said low data rate control channel from one of said first and second base stations to said mobile station includes means for interspersing said information with said transmissions of cryptographically encoded data thereto.

17. A duplex communication system employing cryptographically encoded data within a digital cellular telecommunications network, as set forth in claim 10 in which:
each of said means for generating one of said first, second and third pseudo-random keystreams in accordance with said alogorith includes means for storing a multibit digital value within a register and means for generating said one of said key streams as a function of the value stored within said register; and each of said means for periodically transmitting synchronization information from one of said first and second base stations to said mobile station includes means for transmitting the value stored within the register of said one of said base stations to said mobile station for comparison with the value stored within the register of said mobile station to determine whether the key streams generated in said one of said base stations and said mobile station are in synchronism with one another.

18. A duplex communication system employing cryptographically encoded data within a digital cellular telecommunications network, as set forth in claim 10 in which:
the bits of said first, second and third pseudo-random key streams are combined with said streams of data bits carrying information to alter the order thereof and with said streams of cryptographically encoded data to restore the original order thereof.

19. A dulpex communication system employing cryptographically encoded data within a digital cellular telecommunications network, as set forth in claim 10 in which:
the bits of said first, second and third pseudo-random key streams are combined with said streams of data bits carrying information by modulo-2 addition and with said streams of cryptographically encoded data by modulo-2 subtraction.

20. A method for resynchronizing the generation of key stream bits used to cryptographically encode and decode digital communications data transmitted between the base stations and the mobile stations of a digital cellular telecommunications system which comprises:
periodically transmitting synchronization information on a low bit rate channel from said base stations to said mobile stations to maintain the key stream in each mobile station in exact synchronization with the key stream in the base station with which it is in communication;

responding to signals indicative of a handoff of a mobile station from a first base station to a second base station by interrupting the flow of cryptographically encoded data bits from the second base station to the mobile station and instead transmitting synchronization information on a high bit rate channel to the mobile station for a preselected period of time;

continuing to periodically transit synchronization information on a low bit rate channel from the second base station to the mobile station; and responding to either reception by the second base station of correctly decodable cryptographically encoded data bits from the mobile station, indicating that resynchronization has taken place, or the expiration of the preselected period of time by discontinuing transmission by the second base station of synchronization information on the high bit rate channel and resuming transmission of cryptographically encoded data bits from the second base station to the mobile station.

21. A method for resynchronizing the generation of key stream bits used to cryptographically encode and decode digital communications data transmitting between the base stations and the mobile stations of a digital cellular telecommunications system as set forth in claim 20 wherein:

said high bit rate channel upon which synchronization information is transmitted from the second base station to the mobile station after handoff is the fast associated control channel.

22. A method for resynchronizing the generation of key stream bits used to cryptographically encode and decode digital communications data transmitted between the base stations and the mobile stations of a digital cellular telecommunications system as set forth in claim 20 wherein:

said low bit rate channel upon which synchronization information is periodically transmitted from the base stations to the mobile stations is the slow associated control channel.

23. A method for resynchronizing the generation of key stream bits used to cryptographically encode and decode digital communications data transmitted between the base stations and the mobile stations of a digital cellular telecommunications system as set forth in claim 20 wherein:

said preselected period of time is defined by a preselected number of transmissions of uncryptographically encoded synchronization information on the high bit rate channel.

24. A method for resynchronizing the generation of key stream bits used to cryptographically encode and decode digital communications data transmitted between the base stations and the mobile stations of a digital cellular telecommunications system as set forth in claim 20 which also includes:

maintaining a value in a handoff counter which is indicative of the number of times each mobile station has been handed off from one base station to another base station since call set up and using that value to modify the key stream bits used to encode and decode the data bits transmitted between the base stations and the mobile stations and to prevent the reuse of the same pseudo-random key stream bit pattern a second time during the same call.

25. A system for resynchronizing the generation of key stream bits used to cryptographically encode and decode digital communications data transmitted between the base stations and the mobile stations of a digital cellular telecommunications system which comprises:

means for periodically transmitting synchronization information on a low bit rate channel from said base stations to the mobile stations to maintain the key stream in each mobile station in exact synchronization with the key stream in the base station with which it is in communication;

means for responding to signals indicative of a handoff of a mobile station from a first base station to a second base station by interrupting the flow of cryptographically encoded data bits from the second base station to the mobile station and instead transmitting synchronization information on a high bit rate channnel to the mobile station for a preseleted period of time;

means for countinuing to periodically transmit synchronization information on a low bit rate channel from the second base station to the mobile station; and means responsive to either reception by the second base station of correctly decodable cryptographically encoded data bits from the mobile station, indicating that resynchronization has taken place, or the expiration of the preselected period of time for discontinuing transmission by the second base station of synchronization information on the high bit rate channel and resuming transmission of cryptographically encoded data bits from the second base station to the mobile station.

26. A system for resynchronizing the generation of key stream bits used to cryptographically encode and decode digital communications data transmitted between the base stations and the mobile stations of a digital cellular telecommunications system as set forth in claim 25 wherein:

said high bit rate channel upon which synchronization information is transmitted from the second base station to the mobile station after handoff is the fast associated control channel.

27. A system for resynchronizing the generation of key stream bits used to cryptographically encode and decode digital coummunications data transmitted between the base stations and the mobile stations of a digital cellular telecommunications system as set forth in claim 25 wherein:

said low bit rate channel upon which synchronization information is periodically transmitted from the base stations to the mobile stations is the slow associated control channel.

28. A system for resynchronizing the generation of key stream bits used to cryptographically encode and decode digital communications data transmitted between the base stations and the mobile stations of a digital cellular telecommunications system as set forth in claim 25 wherein:

said preselected period of time is defined by a preselected number of transmissions of uncryptographically encoded information on the high bit rate channel.

29. A system for resynchronizing the generation of key stream bits used to cryptographically encode and decode digital communications data transmitted between the base stations and the mobile stations of a digital cellular telecommunications system as set forth in claim 25 which also includes:

means for maintaining a value in a handoff counter which is indicative of the number of times each mobile station has handed off from one base station to another base station since call set up and means for using that value to modify the key stream bits used to encode and decode the data bits transmitted between the base stations and the mobile stations and to prevent the reuse of the same pseudo-random key stream bit pattern a second time during the same call.

30. A method for resynchronizing the generation of key stream bits used to cryptographically encode and decode digital communications data transmitted between the base stations and the mobile stations of a digital cellular telecommunications system which comprises:

synchronizing the generation of key stream bits used to cryptographically encode and decode digital communications data between each of the base stations in the syystem;

periodically transmitting synchronization information on a low bit rate channel from said base to said mobile stations to synchronize the key stream in each mobile stations with the key stream in the base station with which it is in communication;

responding to signals indicative of a handoff of a mobile station from a first base station to a second base station by continuing the flow of cryptographically encoded data bits from the second base station to the mobile station; and continuing to periodically transmit synchronization information on a low bit rate channel from the second base station to the mobile station.

31. A system for resynchronizing the generation of key stream bits used to cryptographically encode and decode digital communications data transmitted between the base stations and the mobile stations of a digital cellular telecommunications system which comprises:

means for synchronizing the generation of key stream bits used to cryptographically encode and decode digital communications data between each of the base stations in the system;

means for periodically transmitting synchronization information on a low bit rate channel from said base stations to said mobile stations to synchronize the key stream in each mobile station with the key stream in the base station with which it is in communication;

means for responding to signals indicative of a handoff of a mobile station from a first base station to a second base station by continuing the flow of cryptographically encoded data bits from the second base station to the mobile station; and means for continuing to periodically transmit synchronization information on a low bit rate channel from the second base station to the mobile station.

32. In a radio communications system including a base station and a mobile station each having a keystream generator which generates a keystream for encrypting and decrypting communications between said base station and said mobile station, said keystream being generated as a function of a plurality of fixed bits and a plurality of variable bits, a method for the synchronization of the keystream in said base station with the keystream in said mobile station comprising the step of:

detecting a handoff of said mobile station to said base station;

transmitting in response to said handoff the current values of the variable bits in one of said base station and said mobile station to the other of said base station and said mobile station; and using the transmitted value of the variable bits to synchronize the keystream in said base station with the keystream in said mobile station.

33. A method according to claim 32 wherein the fixed bits comprise the bits of a secret key and the variable bits comprise the bits of a block counter.

34. A method according to claim 33 wherein the current bit values of the base station block counter are transmitted to the mobile station and used by the mobile station to update the mobile station block counter.

35. A method according to claim 34 wherein the current bit values of the base station block counter are briefly transmitted over a high data rate control channel and periodically transmitted over a low data control channel to the mobile station following said handoff.

36. In radio communications system including a base station and a mobile station each having a keystream generator which generates a keystream for encrypting and decrypting communciations between said base station and said mobile station, said keystream being generated as a function of a plurality of fixed bits and a plurality of variable bits, a system for the synchronization of the keystream in said base station with the keystream in said mobile station comprising the steps of:

means for detecting a handoff of said mobile station to said base station;

means for transmitting in response to said handoff the current values of the variable bits in one of said base station and and said mobile station to the other of said base station and said mobile station; and means for using the transmitted values of the variable bits to synchronize the keystream in said base station with the keystream in said mobile station.

37. A system according to claim 36 wherein the fixed bits comprise the bits of a secret key and the variable bits comprise the bits of a block counter.

38. A system according to claim 37 wherein the current bit values of the base station block counter are transmitted to the mobile station and used by the mobile station to update the mobile station block counter.

39. A system according to claim 38 wherein the current bit values of the base station block counter are briefly transmitted over a high data rate control channel and periodically transmitted over a low data rate control channel to the mobile station following said handoff.

* * * * *

UNITED STATES PATENT AND TRADEMARK OFFICE
CERTIFICATE OF CORRECTION

PATENT NO. : 5,081,679

DATED : January 14, 1992

INVENTOR(S) : Paul Dent

It is certified that error appears in the above-indentified patent and that said Letters Patent is hereby corrected as shown below:

| | | |
|---|---|---|
| Column 10, line 23; | delete "co-ending" | insert --co-pending-- |
| Column 10, line 35; | delete "3 π/3" | insert --3 π/4-- |
| Column 18, line 4; | delete "dulex" | insert --duplex-- |
| Column 19, line 44; | delete "transission" | insert --transmission-- |
| Column 19, line 55; | delete "alogorithm" | insert --algorithm-- |
| Column 20, line 14; | delete "alogorithm" | insert --algorithm-- |
| Column 20, line 39; | delete "dulpex" | insert --duplex-- |

UNITED STATES PATENT AND TRADEMARK OFFICE
CERTIFICATE OF CORRECTION

PATENT NO. : 5,081,679
DATED : January 14, 1992
INVENTOR(S) : Paul Dent

It is certified that error appears in the above-indentified patent and that said Letters Patent is hereby corrected as shown below:

Column 21, line 1;         delete "transit"
                           insert --transmit--

Column 21, line 16;        delete "transmitting"
                           insert --transmitted"

Column 22, line 53;        After "encoded" insert --synchronization--

Column 23, line 14;        After "base" insert --stations--

Column 23, line 16;        delete "stations"
                           insert --station--

Column 24, line 23;        After "data" insert --rate--

Column 24, line 25;        After "In" insert --a--

Signed and Sealed this

First Day of March, 1994

Attest:

BRUCE LEHMAN

Attesting Officer          Commissioner of Patents and Trademarks